United States Patent [19]

Rodth

[11] Patent Number: 4,510,969

[45] Date of Patent: Apr. 16, 1985

[54] CONNECTOR FOR PRESSURIZED SOURCE OF BEVERAGE CONCENTRATE

[75] Inventor: Joseph J. Rodth, Pleasant Valley, Conn.

[73] Assignee: Alco Foodservice Equipment Company, Miami, Fla.

[21] Appl. No.: 339,717

[22] Filed: Jan. 15, 1982

[51] Int. Cl.³ ............................................. F16L 37/28
[52] U.S. Cl. ........................... 137/614.05; 137/614.01; 137/614.04; 137/322
[58] Field of Search ....................... 137/614.01, 614.03, 137/614.04, 614.05, 322; 251/149.6

[56] References Cited

U.S. PATENT DOCUMENTS

| | | | |
|---|---|---|---|
| 2,735,696 | 2/1956 | Omon et al. | 137/614.05 |
| 2,823,048 | 2/1958 | Hansen | 251/149.6 |
| 3,348,575 | 10/1967 | Simak | 137/614.05 |
| 3,625,251 | 12/1971 | Nelson | 137/614.05 |
| 3,851,666 | 12/1974 | Hammond | 251/149.6 |
| 4,219,048 | 8/1980 | Ekman | 251/149.6 |
| 4,271,865 | 6/1981 | Galloway et al. | 137/614.06 |

Primary Examiner—A. Michael Chambers
Attorney, Agent, or Firm—Haight, Hofeldt, Davis & Jambor

[57] ABSTRACT

A separable connector for use in conveying beverage concentrate from a pressurized source to a dispenser has the bias springs for valve actuation isolated from the concentrate. This feature, coupled with a removal of areas that can cause a congregation of concentrate and the use of relatively large flow path areas, provides a connector that has a minimum of blockage problems. Other important aspects of this connector include poppet valve structure, sealing arrangements, easy cleaning by back flow, a simple and effective engaging of connector sections, easy disassembly of connector sections and an interlock arrangement to insure a proper sequence for valve actuation.

1 Claim, 3 Drawing Figures

CONNECTOR FOR PRESSURIZED SOURCE OF BEVERAGE CONCENTRATE

BACKGROUND OF THE INVENTION

1. Field of the Invention

This invention relates generally to a connector for use with a pressurized source of beverage concentrate, and more specifically, this invention relates to a separable connector for selectively attaching a pressurized source of beverage concentrate to a line leading to an appropriate dispenser valve.

2. Description of the Prior Art

Beverage dispensers generally involve the mixing of beverage concentrate with a suitable diluent, such as sweet water or carbonated water. Mixing of the concentrate and the diluent may take place either prior to dispensing or during the dispensing operation (generally referred to, respectively, as pre-mix and post-mix operation). These dispensers may utilize either gravity flow or pressurized flow of the concentrate and the diluent.

The present invention relates to the obtaining of a beverage concentrate from a pressurized source. While the present invention has applicability in connection with any type of pressurized beverage concentrate, it is particularly useful for concentrates that have a pulpy nature, such as orange juice concentrate.

Currently available connectors for such pulpy concentrates tend to be unreliable in that the concentrate tends to build up inside the connector and adversely affect the flow of the concentrate. In addition, it is difficult to remove the pulpy concentrate from these connectors during the cleaning operation, without dismantling the entire connector.

Accordingly, it is desirable to have a connector that may be quickly and easily engaged and disengaged, that can pass pulpy concentrates without becoming partially or completely blocked and that can be easily cleaned without complete disassembly of the entire connector.

SUMMARY OF THE INVENTION

In the connector of the present invention, a section of the connector attached to a line leading to the dispenser may be quickly and easily engaged with a section of the connector that is secured to the pressurized source of concentrate. Bias springs for the poppet valves are enclosed to prevent contact with the concentrate, and hence preclude the build-up of pulpy material on the springs. The fluid flow passage through the connector has a relatively large area and all openings are also large and formed with sloping or curved sides to minimize the build-up of pulpy material. In addition, an interlocking arrangement is provided so that the valve in the connector section attached to the line leading to the dispenser is always opened before the valve in the connector section secured to the pressurized source. Thus, the pressurized source of concentrate is always maintained in a closed condition unless the line to the dispenser valve is open to receive concentrate.

In order to provide these desirable features, the section of the connector secured to the pressurized source of concentrate has a fitting that is rigidly attached, such as by welding, to a top plate or flange of the pressurized source. This fitting is provided with external threads to engage internal threads on a housing for this first section of the connector. The housing has a relatively large opening at one end, which is surrounded by a shoulder that provides a valve seat.

A suitable valve arrangement, such as a poppet valve assembly, is mounted in the housing. The valve assembly includes a valve retainer or holder that has a radially extending shoulder at a large open end thereof. This extending shoulder is clamped between a shoulder on the housing and the top of the fitting to secure the retainer.

The valve retainer has a smaller diameter portion in which is located a bias spring for the poppet valve. A valve actuating member fits in this lower diameter portion with a relatively close fit and suitable sealing means, such as an O-ring seal, are provided to prevent concentrate from reaching the spring.

A conduit tube assembly fits over the valve retainer with a substantial clearance between the internal diameter thereof and the outer surface of the smaller diameter portion of the retainer to provide a path for the concentrate. However, the conduit tube closely fits the larger diameter portion of the valve retainer and a fluid-tight seal, such as an O-ring seal, as provided therebetween.

A smaller diameter portion of the conduit tube extends to the bottom of the pressurized source of concentrate. The bottom of this smaller diameter portion of the conduit tube is formed at an angle so that the concentrate may pass into the smaller diameter conduit tube portion and up to the larger diameter portion of the conduit tube. Suitable openings are provided in the valve retainer to permit concentrate passing over the smaller diameter portion of the retainer to flow to the interior of the larger diameter portion of the retainer, where there is a sizable clearance between the interior wall of that portion of the retainer and the outer surface of the actuating member that extends therethrough. The flow path continues through the open end of the retainer, through which the actuating member also extends. A suitable seal, such as an O-ring seal, is provided adjacent the end of the actuating member to engage the valve seat shoulder in the housing when the valve is closed.

The other section of the connector has an extending tube for attachment to the line leading to a dispenser valve. A suitable engaging arrangement is provided for easily and quickly connecting this section of the connector to the first section. In the preferred embodiment disclosed herein, a rotatable sleeve has a plurality of off-set openings or cut-out hooks to engage suitable projections or pins located on the first section of the connector. This rotatable sleeve is mounted on the second section of the container with an appropriate sealing arrangement.

Another valve assembly, such as a poppet valve, is located in the housing of the second section of the connector. This poppet valve assembly includes an actuating member that extends into an opening, such as a generally cylindrical opening formed in a valve retainer that is threadedly inserted into one end of the housing. This actuating member fits in the retainer with a fairly close tolerance and a suitable fluid-tight seal, such as an O-ring seal, is provided to prevent concentrate from passing between the actuating member and the inner surface of the opening in the retainer.

The actuating member has an opening, such as a generally cylindrical bore, that extends for the major portion of the actuating member. A bias spring is located in this bore and a spacer or plunger fits into the bore on top of the spring.

The housing of this section section of the connector has an extending shoulder to provide a valve seat for the poppet valve assembly. The actuating member has a suitable sealing arrangement, such as an O-ring seal, mounted to engage this extending shoulder when the valve is closed. An extending arm formed on the end of the actuating member passes through the valve seat area and is adapted to fit into a corresponding chamber in the top of the actuating member for the poppet valve of the first section.

When the sections of the connector are separated, the respective bias springs close the poppet valves in each of those sections so that no fluid flow can occur. As the two sections are joined, the extending arm of the actuating member in the section attached to the line leading to the dispenser valve fits into the chamber on the other actuating member. The bias spring for the poppet valve in the section attached to the pressurized source of concentrate is considerably stronger than the bias spring for the poppet valve in the other section. Thus, as the sections are pushed together, the poppet valve in the section attached to the line is opened first. Continued movement of the sections toward one another causes the actuating member of the poppet valve in the section attached to the line to engage the top of the retainer, which precludes any further opening of this valve. Thus, as the sections are brought together beyond this point the poppet valve in the section attached to the pressurized source is opened, and when the rotatable sleeve is turned to engage the sections, both valves are open. Concentrate can then flow under pressure to the dispenser valve.

All of the openings through which the concentrate flows are relatively large and formed with sloping or curved surfaces to provide a minimum of points at which pulpy concentrate could congregate. Also, when the pressurized source is empty, the connector may be easily cleaned by passing water or some other clear fluid back through the connector to remove any remaining concentrate.

When the sections are separated, the reverse type of action occurs, in that the stronger spring in the poppet valve assembly of the section attached to the pressurized source keeps the poppet valve in the other section open until the valve in the section attached to the pressurized source is closed. Further separation of the two sections then results in the closing of the valve in the section attached to the line leading to the dispenser valve. In this way, the valve in the connector section attached to the pressurized source is always closed before the other valve, and both valves are closed when the connector sections are separated, so there can be no leakage of fluid from either the pressurized source or the dispenser at that time. It may also noted that while cleaning can easily be achieved by a back flow through the connector, the connector sections may be relatively easily disassembled for repair or if an unusual obstruction should occur.

These and other objects, advantages and features of this invention will herein after appear, and for purposes of illustration, but not of limitation, and exemplary embodiment of the subject invention is shown in the appended drawing.

BRIEF DESCRIPTION OF THE DRAWING

FIG. 3 is an exploded version of the cross-sectional view of FIG. 2.

DETAILED DESCRIPTION OF THE PREFERRED EMBODIMENT

Figure 1:
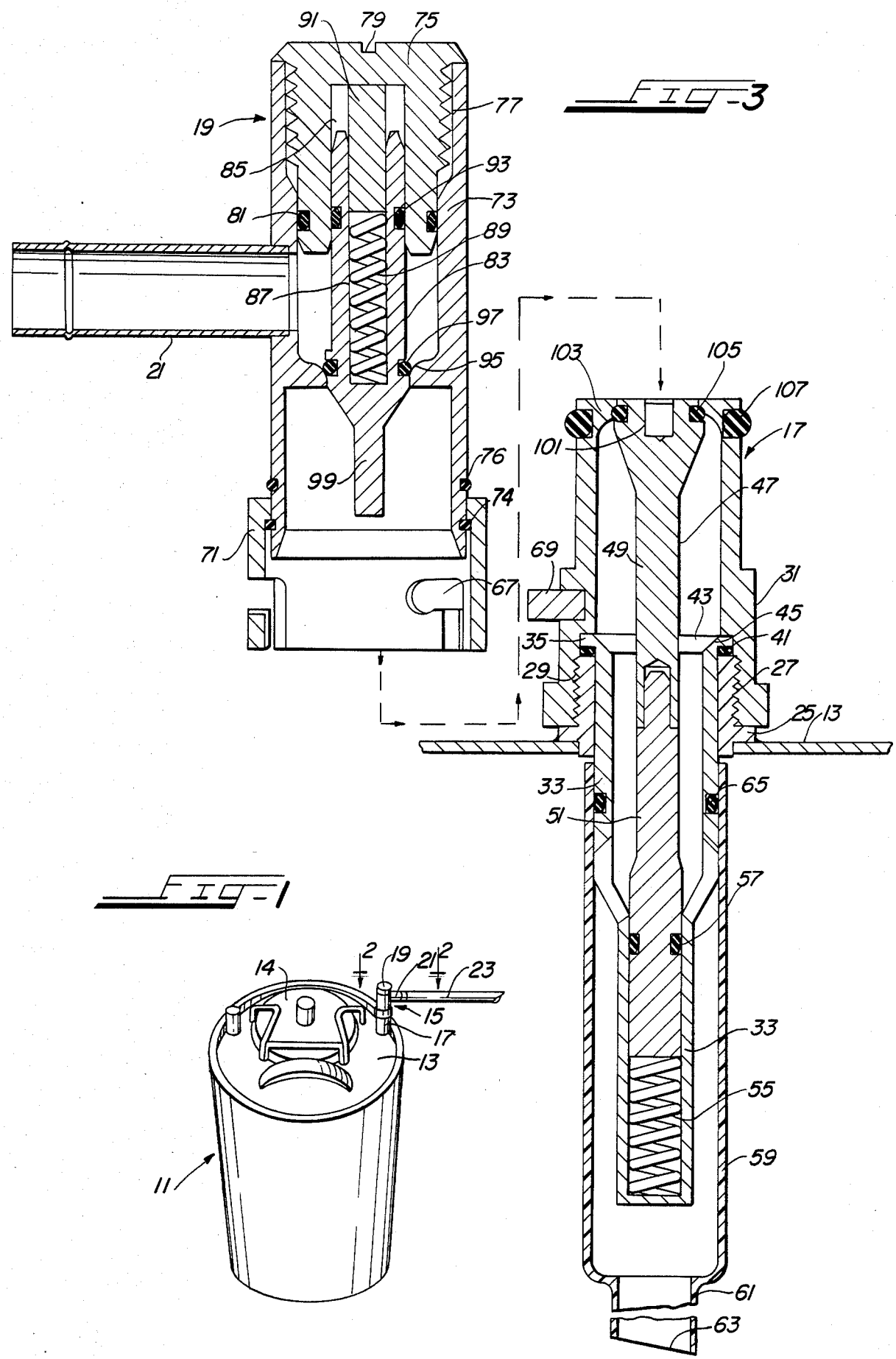
FIG. 1 is an elevational view of a preferred embodiment of the connector of this invention in place on top of a pressurized source of beverage concentrate.

A pressurized source 11 of concentrate, such as a pulpy orange juice concentrate, is disclosed in FIG. 1. The pressurized container 11 has a top flange or plate 13 and a tightly secured lid 14, through which the concentrate may be placed in the container.

A connector 15 to permit the pressurized concentrate to be passed to a suitable dispensing valve has a first section 17 secured to plate 13 of the container 11. A second section 19 of connector 15 is separable from section 17. Section 19 has an outlet tube 21 for attachment to a line or hose 23 leading to the dispenser valve.

Figure 2:
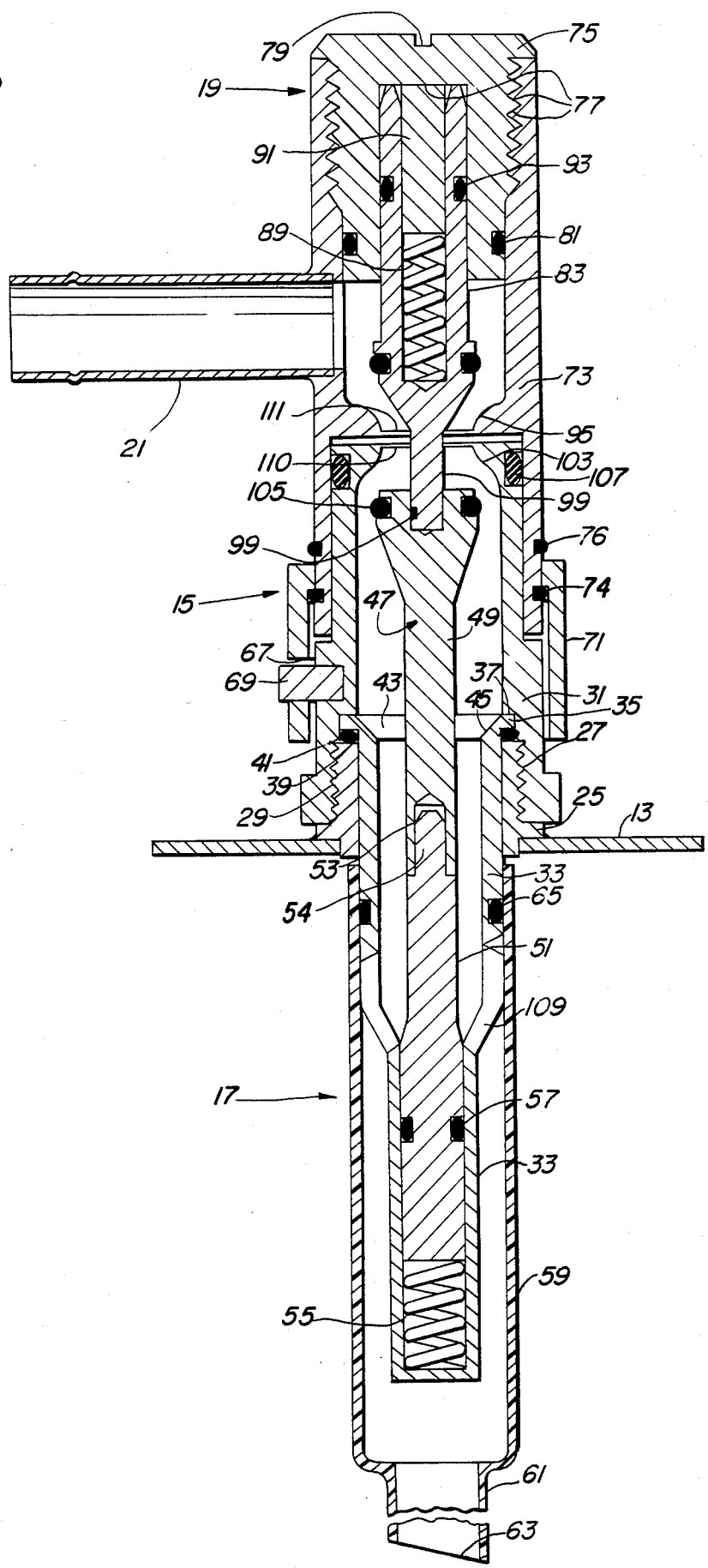
FIG. 2 is a cross-sectional view of the connector of the present invention taken along line 2—2 of FIG. 1.

The cross-sectional views of FIGS. 2 and 3 illustrate the details of connector 15 in the engaged and disengaged conditions, respectively. With reference to these two drawings, it may be seen that the section 17 of connector 15 has a fitting 25 that is secured to plate 13, such as by welding. Fitting 25 is provided with external screw threads 27 to engage corresponding threads 29 located on an interior surface of housing 31. Housing 31 is the housing for outlet connector section 17 and is the portion of section 17 that is separably connected to connector section 19.

A retainer or holder 33 for a valve assembly, such as a poppet valve assembly, is secured in housing 31. Retainer 33 has an upper shoulder 35 that is located between an inwardly extending shoulder 37 on housing 31 and the top 39 of fitting 25. As threads 27 and 29 are engaged, shoulder 35 is clamped between shoulder 37 of housing 31 and the top 39 of fitting 25. In order to provide a fluid-tight seal to prevent any leakage to the environment, a suitable arrangement, such as an O-ring seal 41, may be placed between the shoulder 35 and the top 39 of fitting 25.

An opening 43 is formed in the top of retainer 33. Opening 43 has a generally frusto-conical shape, so that the sloping sides 45 will aid in preventing the buildup of pulpy concentrate, such as that for orange juice.

A valve-actuating member 47 extends through opening 43 in retainer 33. This actuating member 47 could be a single integral piece, but for ease of manufacturing it is formed as two portions 49 and 51. These two portions are interconnected by means of cylindrical opening 53 in the bottom of portion 49 receiving an extended neck 54 of portion 51.

Actuating member 47 fits in an upper, larger diameter portion of retainer 33 with a substantial clearance to form a concentrate flow path therebetween. However, actuating member 47 also extends into a lower, smaller diameter portion of retainer 33 with a relatively close fit. A bias spring 55 is located in the bottom of the smaller diameter portion of retainer 33 to contact the bottom of actuating member 47 and urge it upwardly. Bias spring 55 is isolated from the concentrate by a suitable sealing arrangement, such as O-ring seal 57.

Retainer 33 is located in a conduit tube assembly 59 that extends to the bottom of the container 11 through a reduced diameter portion 61 thereof. The bottom 63 of reduced diameter portion 61 of conduit tube assembly 59 is formed at an angle to permit the fluid in container 11 to flow therein. A fluid-tight seal is formed between the upper portion of conduit tube assembly 59 and the larger diameter portion of retainer 33, such as by an appropriate O-ring seal 65. However, there is a sizable clearance between the inner surface of conduit tube 59 and the exterior of the smaller diameter portion of retainer 33 to provide a concentrate flow path.

Connector section 19 is to be quickly and easily joined to and separated from section 17. Any suitable approach could be utilized, but in this preferred embodiment the engagement between sections 19 and 17 is achieved by means of stepped openings or cut-out hooks 67 formed in section 19 to engage suitable projecting pins 69 located on housing 31 of section 17. Any appropriate number of openings and pins may be utilized, but in this preferred embodiment there are three hooks or openings 67 and the corresponding pins 69.

Stepped openings or cut-out hooks 67 are located in a rotating sleeve holder 71 that is mounted on connector section housing 73. A suitable capture arrangement, such as thrust rings 74 and 76, prevents the escape of any concentrate between rotating sleeve holder 71 and housing 73.

A valve retainer or holder 75 for a valve assembly, such as a poppet valve assembly, is located in housing 73. Cooperating thread 77 on the interior of housing 73 and the exterior of retainer 75 permit the insertion and extraction of retainer 75 from housing 73. A slot 79 permits the use of a suitable tool, such as a screwdriver, if necessary, to tighten or loosen the connection between retainer 75 and housing 73. A suitable sealing arrangement, such as O-ring seal 81, is utilized to prevent concentrate leakage between retainer 75 and housing 73.

A movable valve actuating member 83 is located in a generally cylindrical opening 85 in retainer 75. Actuating member 83, in turn, has a cylindrical opening 87 extending most of its length. A spring 89 is located in the bottom of cylindrical opening 87. A spacer or plunger 91 is located in cylindrical opening 87 on top of spring 89. A fluid-tight seal is provided between actuating member 83 and cylindrical opening 85 by a suitable arrangement, such as an O-ring seal 93.

A valve seat is provided by protruding shoulder 95 in housing 73. Valve seat 95 is engaged by an O-ring seal 97 when the poppet valve is in the closed position. A projecting arm 99 on actuating member 83 is adapted to fit in a corresponding chamber 101 in actuating member 47 to maintain alignment of the actuating members and operationally interrelate the valves.

A valve seat is provided in section 17 by a shoulder 103 located at the top of housing 31. An O-ring 105 located on actuating member 47 engages the shoulder 103 when the poppet valve is in the closed position. Also, a suitable seal, such as an O-ring seal 107, is provided when sections 17 and 19 are engaged to prevent concentrate leakage between the sections.

When sections 19 and 17 are separated, as shown in FIG. 3, bias spring 55 forces actuating member 47 upward so that O-ring 105 engages shoulder 103. This prevents any flow of concentrate from section 17. At the same time, bias spring 89 forces spacer 91 into contact with retainer 75 at the top of opening 85. As a consequence, the bias spring 89 forces the actuating member 83 downward so that O-ring 97 engages shoulder 95 to prevent any flow back from the dispenser valve.

When sections 19 and 17 are joined, the projecting arm 99 fits into chamber 101. Since bias spring 55 is made considerably stronger than bias spring 89, approximately twice as strong in the preferred embodiment hereof, forcing section 19 down on section 17 causes actuating member 83 to be moved upward against the force of spring 89. This separates O-ring 97 from shoulder 95 and provides a path for concentrate flow in section 19.

After actuating member 83 contacts retainer 75 at the top of cylindrical opening 85, further pushing of section 19 onto section 17 moves actuating member 47 against the force of spring 55 to separate O-ring 105 from shoulder 103. This then opens the path for fluid flow through section 17, and the conditions are as shown in FIG. 2.

At this point, pressurized concentrate can enter section 61 of conduit tube assembly 59, pass up through tube assembly 59, openings 109 in retainer 33, opening 45 at the top of retainer 33, openings 110 and 111 formed about the extending arm 99, through housing 73 and out the tube 21 to ultimately reach the dispenser valve.

When section 19 is removed from section 17, the reverse action occurs so that O-ring 105 contacts shoulder 103 and seals section 17 before O-ring 97 contacts shoulder 95 to seal section 19. Thus, there can be no flow of pressurized concentrate unless the poppet valve in section 19 is open to premit concentrate flow to the dispenser valve.

With the sections 17 and 19 engaged, as shown in FIG. 2, the connector 15 may be easily cleaned by a back-flow of water or other cleaning liquid, when pressurized container 11 is empty and no longer pressurized. Since the flow passages are generally unrestricted and openings 43, 109, 110 and 111 are formed with sloping and curved surfaces to minimize build-up of pulpy concentrate, back flow cleaning will usually suffice. However, if an unusual blockage should occur, or if a poppet valve assembly has to be repaired or replaced, sections 17 and 19 are easily disassembled, respectively, by unthreading housing 31 from fitting 25 and retainer 75 from housing 73.

It should be understood that various modifications, changes and variations may be made in the arrangement, operation and details of construction of the elements disclosed herein without departing from the spirit and scope of this invention.

I claim:

1. A separable connector for releasably securing a pressurized source of concentrate to a line leading to a dispenser valve comprising:
    a conduit tube to receive concentrate from the pressurized source;
    a first poppet valve retainer mounted in said conduit tube, a larger diameter portion sealingly contacting said conduit tube and a smaller diameter portion extending downwardly into said conduit tube;
    a first bias spring located in the bottom of said smaller diameter portion of said first retainer;
    a first poppet valve actuating member extending into said smaller diameter portion of said first retainer to contact said first bias spring;
    fluid-tight seal means between said first actuating member and said smaller diameter portion;
    at least one relatively large opening having sloped sides to minimize congregation of pulpy concentrate extending to the interior of said retainer;
    an opening in the end of the larger diameter portion of said retainer having sloped sides;
    a first housing in which said first poppet valve retainer is mounted;

a fitting secured to the pressurized source of concentrate, said first housing releasably attached to said fitting;

an extending shoulder at the other end of said first housing forming a first valve seat;

sealing means adjacent the end of said first actuating member away from said first bias spring to engage said first valve seat when said first poppet valve is closed;

a second housing;

a rotatable slip ring mounted on said second housing;

at least one stepped opening formed in said slip ring;

at least one projecting pin on said first housing to fit into said stepped opening to engage said first and second housings;

a second poppet valve retainer releasably fastened in said second housing;

a generally cylindrical opening formed in said second retainer;

a second poppet valve actuating member extending into the opening in said second retainer;

sealing means to preclude concentrate obtaining access to the opening in said second retainer between said second actuating member and said second retainer;

a generally cylindrical opening in said second actuating member extending the major portion of the length of said second actuating member;

a second bias spring located in the opening in said second actuating member;

a plunger located in the opening in said second actuating member over said bias spring;

an extending shoulder on the interior of said second housing forming a second valve seat;

sealing means on the exterior of said second actuating member to engage said second valve seat when said second poppet valve is closed;

a projecting arm on the end of said second actuating member; and a chamber on the end of said first actuating member to receive said projecting arm on said second actuating member.

* * * * *